(12) United States Patent
Nakaya

(10) Patent No.: US 7,130,532 B2
(45) Date of Patent: Oct. 31, 2006

(54) VIDEO RECORDING/REPRODUCING APPARATUS

(75) Inventor: Yosihisa Nakaya, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1189 days.

(21) Appl. No.: 09/972,416

(22) Filed: Oct. 5, 2001

(65) Prior Publication Data

US 2002/0136539 A1 Sep. 26, 2002

(30) Foreign Application Priority Data

Mar. 21, 2001 (JP) .............................. 2001-001473

(51) Int. Cl.
*H04N 5/85* (2006.01)
(52) U.S. Cl. .......................... 386/125; 386/69; 386/46; 386/126; 386/83
(58) Field of Classification Search .................. 386/46, 386/69–70, 125–126, 83
See application file for complete search history.

(56) References Cited

U.S. PATENT DOCUMENTS 5,798,785 A * 8/1998 Hendricks et al. ............ 725/46

FOREIGN PATENT DOCUMENTS

JP A-07-37369 2/1995

* cited by examiner

*Primary Examiner*—James J. Groody
*Assistant Examiner*—Helen Shibru
(74) *Attorney, Agent, or Firm*—Osha Liang LLP

(57) ABSTRACT

When a recording menu screen is selected by a remote controller 13, a control unit 10 enters a recording programming mode to display the recording menu screen on a monitor 8. When any optional video file is selected from the list on said recording menu screen by a user, the area of the selected video file is registered as a recordable area and a recording programming screen is displayed on the monitor 8 to enable recording programming. Upon completion of the recording programming, when the control unit 10 enters a recording operation mode, it records the video data in a selected area on an HDD 10, and if the recording operation is not completed even when the video data is recorded until said area becomes full, continuously records the video data in a vacant area of the HDD 5.

9 Claims, 9 Drawing Sheets

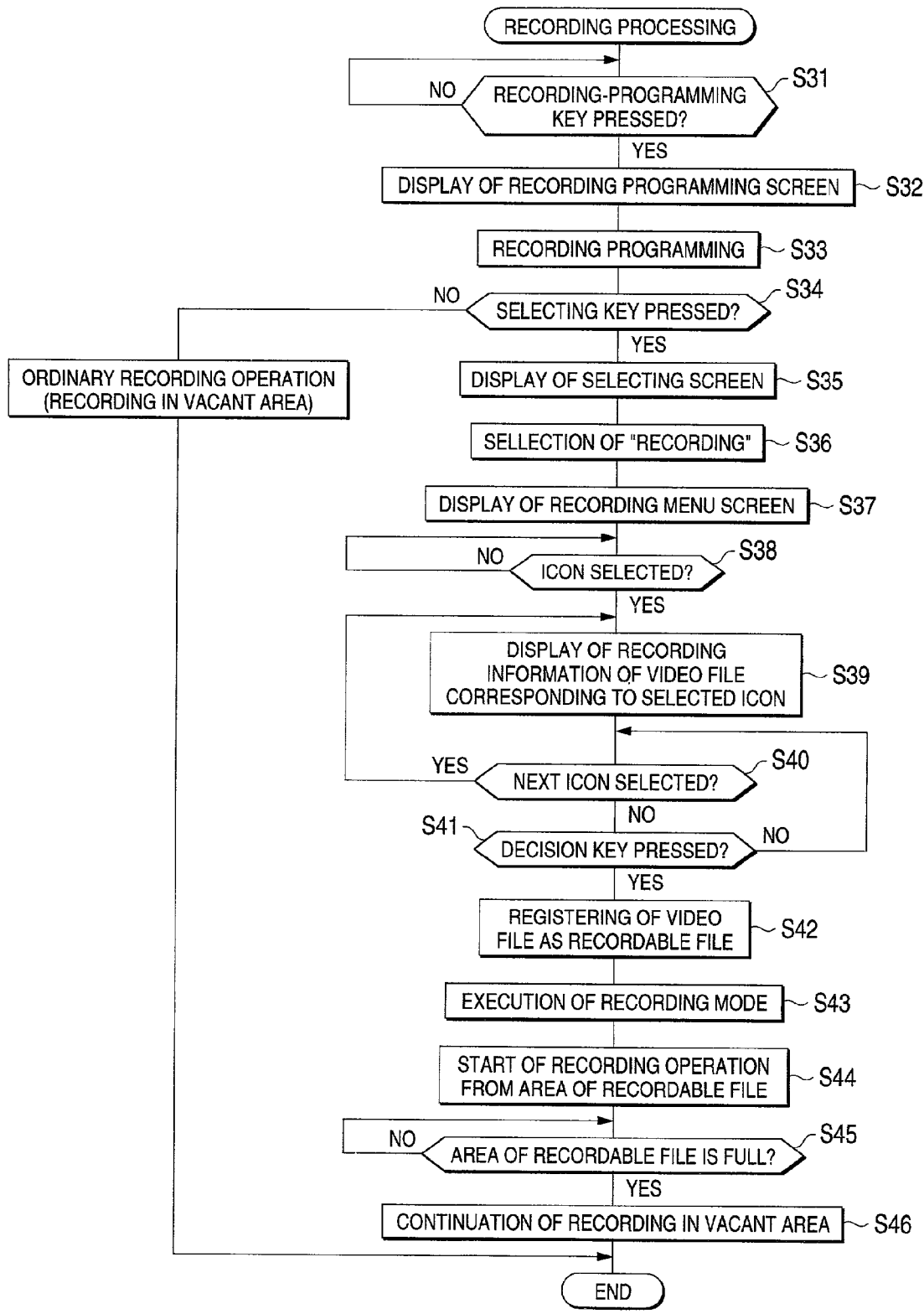

VIDEO RECORDING/REPRODUCING APPARATUS

BACKGROUND OF THE INVENTION

1. Technical Field

This invention relates to a video recording/reproducing (playback) apparatus which records various video data in a recording/reproducing hard disk and reproduces the recorded video data displayed on a screen.

2. Related Art

In recent years, as a recording medium for recording a digital video broadcasting signal in CS broadcasting or BS broadcasting, a video recording/reproducing apparatus using a hard disk in place of a video tape which was used conventionally has been provided.

The recording of the video data such as the digital broadcasting signal in such a hard disk necessarily reaches a limit of capacity. The hard disk, unlike a disk medium such as a video tape or CD-ROM, is securely set up within an appliance and generally cannot be replaced easily by a user. This is because the hard disk is fabricated very precisely and its handling by a general user damages the data as the case may be. Therefore, the hard disk set up within the appliance has a predetermined data quantity (capacity). The recording after having reached the limit of capacity is performed so as to record new data (overwrite recording) while the old video data are being erased (concretely, erased in order from the video data initially recorded).

[Problems to be solved]

Namely, the rewrite of data is executed irrespectively of the intention of a user. Therefore, the video data which have been already unnecessary for the user cannot be overwritten with new video data through selection by the user. This is problematic.

When various video data recorded in the hard disk are reproduced, the conventional video recording/reproducing apparatus using the hard disk has no means for knowing the contents of the video data recorded in the hard disk beforehand. Therefore, the user has been required to make a troublesome operation of searching video data the user wants to watch by reproducing the video data sequentially from the start, or otherwise in the reproducing (playback) mode changed at a suitable timing after fast-forward.

Incidentally, the video recording/reproducing apparatus disclosed in e.g. the Unexamined Japanese Patent Application Publication No. Hei7-37369 is provided with the means for displaying the recorded contents before reproduction. In this apparatus, in recording, identification information for identifying a video cassette is recorded on a magnetic tape and the recording information indicative of the recording contents, e.g. still image data of a scene of a program is stored in a memory. In reproducing, the still image data of each program read from the memory is displayed on a screen. Therefore, the user can know the video data recorded on the magnetic tape before reproducing. However, this technique relates to the magnetic tape. Particularly, repeated overwrite recording may lead to inconsistency between the recorded contents on the magnetic tape and the contents stored in the memory. Therefore, this technology cannot be directly applied to the video recording/reproducing apparatus using the hard disk. Further, although displaying the still image data of the program permits the contents of the programs and their recorded positions to be recognized, when a new program is recorded on any recorded program, the magnetic tape must be fed back to the start of the pertinent recorded program, and thereafter recording operation or recording programming must be done. As in the prior art, the recording operation is still troublesome.

This invention has been accomplished in order to solve the problems described above. An object of this invention is to provide a video recording/reproducing apparatus which can reproduce or overwrite-record the video data desired by a user by a very simple operation when any video data are reproduced from a hard disk or when any video data recorded in the hard disk is overwritten with new video data.

SUMMARY OF THE INVENTION

[Means for Solving the Problems]

In order to solve the above problem, in a video recording/reproducing apparatus for recording various video data as files in a recording/reproducing disk and reproducing the recorded video data so that they are displayed on a screen, this invention is characterized by comprising:

display section for displaying a list of video files previously recorded in the recording/reproducing disk as a recording menu screen or a reproducing menu screen;

selecting section for selecting either one of the recording menu screen and the reproducing menu screen;

recording control section which enters a recording programming mode to display the recording menu screen on the display section when the recording menu screen is selected by the selecting section, and displays a recording programming screen on the display section to enable recording programming when any optional video file is selected from the list on the recording menu screen; and reproducing control section which enters a reproducing mode to display the reproducing menu screen on the display section, when the reproducing menu screen is selected by the selecting section, and reproduces the video data recorded in any optional file when the optional file is selected from the list on the reproducing menu screen, and in that the recording control section records the video data in an area of the video file selected from the recording menu screen during a recording operation, and if the recording operation is not completed even when the video data is recorded until the area becomes full, continuously records the video data in a vacant area of the recording/reproducing disk.

In accordance with this invention having such a feature, when the recording menu screen is selected by the selecting section, the recording control section enters a recording programming mode to display the recording menu screen on the display section. When any optional video file is selected from the list on the recording menu screen by a user, the area of the selected video file is registered as a recordable area and a recording programming screen is displayed on the display section to enable recording programming. Upon completion of the recording programming, when the recording control section enters a recording operation mode, it records the video data in an area of the video file selected from the recording menu screen, and if the recording operation is not completed even when the video data is recorded until the area becomes full, continuously records the video data in a vacant area of the recording/reproducing disk.

The reproducing control section enters a reproducing mode to display the reproducing menu screen on the display section when the reproducing menu screen is selected by the selecting section, and reproduces the video data recorded in any optional file when the optional file is selected from the list on the reproducing menu screen.

In this way, in accordance with this invention, where the user wants to make the recording or reproducing, since the list of video files of various video data previously recorded in the recording/reproducing disk is displayed as the recording menu screen or reproducing menu screen, the user can easily select the video file which may be canceled for overwrite-recording or the user wants to reproduce. If there is the video file which maybe canceled for overwrite-recording, by selecting the video file on the recording menu screen, the display is automatically advances to an ordinary recording programming screen. Thus, the user can continuously make the recording programming as usual.

Further, in a video recording/reproducing apparatus for recording various video data as files in a recording/reproducing disk and reproducing the recorded video data so that they are displayed on a screen, this invention is characterized by comprising:

display section for displaying a list of video files previously recorded in the recording/reproducing disk as a recording menu screen in a recording mode or recording programming mode; and control section for recording new video data in a manner of overwriting an area containing any optional recorded video file when the optional video file is selected from the list on the recording menu screen.

In this invention having such a feature, the control section causes the recording menu screen in the recording mode or recording programming mode on the display section. When any optional video file is selected from the list on the recording menu screen by a user, the control section records a new data in the area of the selected video file. Namely, when the user selects the video file which may be canceled from the recording menu screen, the new data is recorded in the area selected by the user. In short, the recording area by overwriting can be freely selected by the intension of the user.

Further, the video recording/reproducing apparatus according to this invention is characterized in that in the recording programming mode, the control section displays the recording programming screen on the display section to enable recording programming when any optional video file is selected from the list on the recording menu screen. In this configuration, if there is the video file which may be canceled for overwrite-recording, by selecting the video file on the recording menu screen, the display is automatically advances to an ordinary recording programming screen. Thus, the user can continuously make the recording programming as usual.

The video recording/reproducing apparatus according to this invention is characterized in that in the recording programming mode, the control section displays the recording programming screen on the display section to enable recording programming, and displays the recording menu screen on the display section when it receives a completion signal of the recording programming. In this configuration, when the user makes the recording programming, the display is automatically advances to an ordinary recording programming screen so that the recording area of the video data recording-programmed this time can be selected from the recording menu screen. Namely, if the user want to leave all the video data previously recorded, by selecting a vacant area, the control section can record a new video data in the vacant area of the recording/reproducing disk. Further, there is an unnecessary video file which he has watched, by selecting this unnecessary video file on the recording menu screen, the control section can overwrite-record the new video data in the area in which the video data of this video file has been recorded. In short, the recording area can be selected according to the intention of the user.

The video recording/reproducing apparatus according to this invention is characterized in that the control section compares the recording-completed time of the video data recorded in a selected video file with the recording-programmed time of the video data recording-programmed, and if the recording-programmed time is longer than the recording-completed time, gives a warning from the display section. Giving the warning permits the user to select the subsequent measure freely. For example, if the user wants to record continuously in the vacant area the video data which cannot be sufficiently recorded, he has only to select the file of the vacant area displayed on the recording menu screen. Incidentally, if the user wants to record the video data continuously in the vacant area, the apparatus itself may be default-set so that the video data is recorded automatically in the vacant area with no selection by the user. Further, if there is another video file which maybe canceled, by selecting this video file from the recording menu screen, the recording-programmed video data can be recorded in a separate manner in the area of the initially selected video file and that of the next selected video file (as a single video file in terms of the video data).

The video recording/reproducing apparatus according to this invention is characterized in that if the recording operation is not completed even when the video data is recorded until the area of the video file selected from the recording menu screen becomes full, the control section continuously records the video data in a vacant area of the recording/reproducing disk. In this configuration, even if the video data which is being recorded is longer than the video data which is being overwritten, the recording operation is not suspended on the way.

The video recording/reproducing apparatus according to this invention is characterized in that in the reproducing mode, the display section displays a list of video files previously recorded in the recording/reproducing disk as a reproducing menu screen; and the control section reproduces the video data recorded in any optional file when the optional file is selected from the list on the reproducing menu screen. In this configuration, since not only the recording menu screen but also the reproducing menu screen is displayed by selection by the user, by seeing the list of the video files displayed on the reproducing menu screen, the user can easily select and reproduce the video file which he want to watch.

BRIEF DESCRIPTION OF THE DRAWINGS

FIG. 5 is a flow chart for explaining the recording operation of the third embodiment.

DETAILED DESCRIPTION OF THE PREFERRED EMBODIMENTS

[Mode for Carrying Out the Invention]

Figure 1:
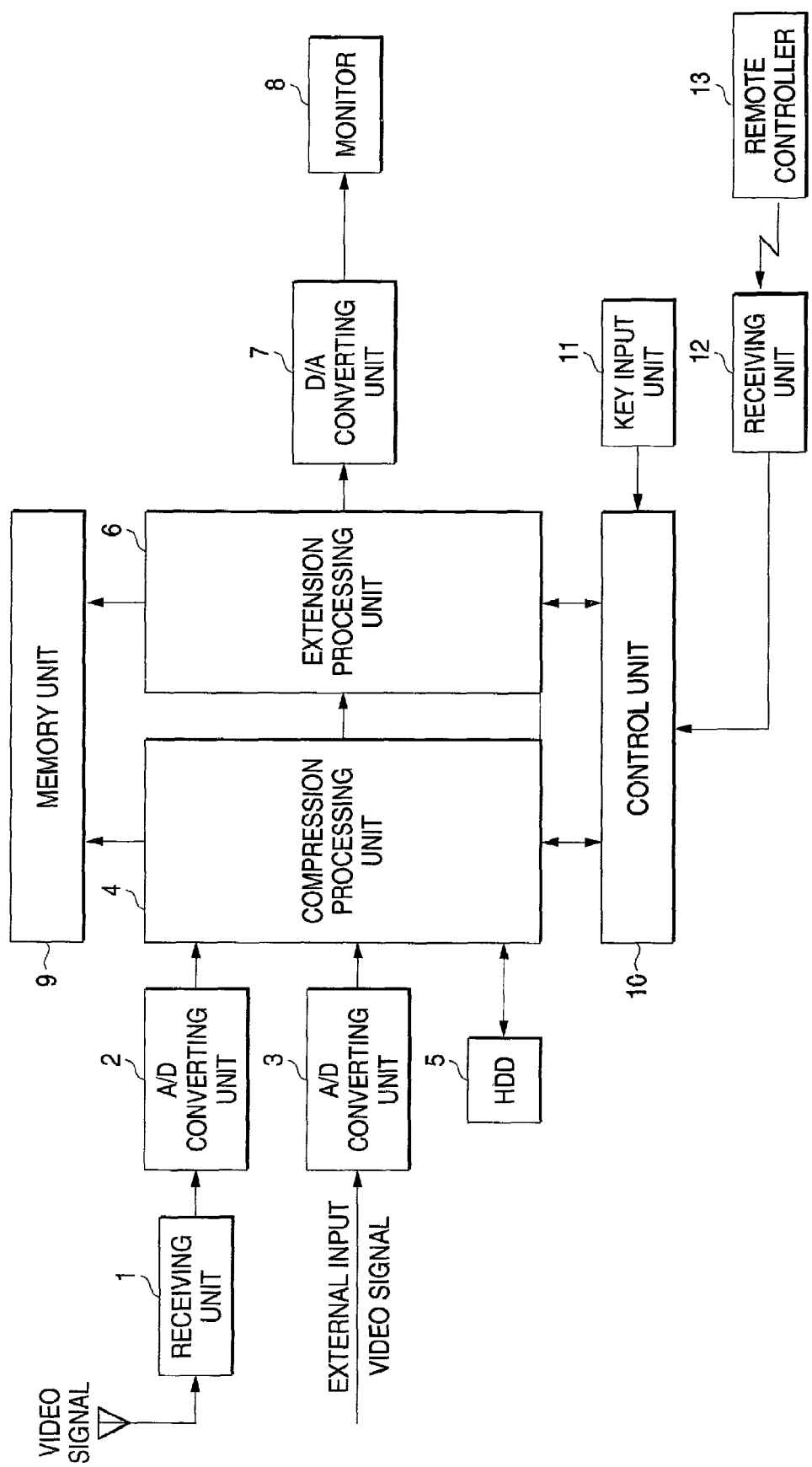
FIG. 1 is a block diagram of an embodiment of a video recording/reproducing apparatus according to this invention.

Now referring to the drawings, an explanation will be given of a mode for carrying out this invention.

FIG. 1 is a block diagram showing a mode for carrying out the video recording/reproducing apparatus according to this invention.

The video recording/reproducing apparatus includes a receiving unit 1 incorporating a television tuner for receiving a video signal; an A/D converting unit 2 for converting the analog video signal received by the receiving unit 1 into a digital video signal; an A/D converting unit 3 for converting the analog video signal which is externally received into the digital video signal; a compression processing unit 4 for compression-processing the digital video signals converted by these A/D converting units 2 and 3 in an MPEG-2 scheme; a hard disk drive (HDD) 5 for recording the video data thus compression-processed; an extension-processing unit 6 for decompressing the video data read (reproduced) from the HDD 5 in to original video data; a D/A converting unit 7 for converting the decompressed video data from the digital signal into the analog signal; a monitor 8 for screen-displaying the video data converted into the analog signal by the D/A converting unit 7; a memory unit (D-RAM) 9 which serves as a buffer memory for once storing the video data in the compression-processing or the extension-compressing; a control unit 10 for controlling the operation of the entire apparatus; a key entry unit 11 for keying various key operating signals into the control unit 10; a key receiving unit 12 for receiving the various key operating signals; and a remote controller 13 for executing various key (button) operations.

In the arrangement described above, the video data recorded in the HDD 5 are individually managed as video files. The record at the starting portion of each video file contains recording information of the pertinent video data (e.g. receiving channel, recording date and time, recording starting time, recording ending time, recording mode, etc.).

The control unit 10 has a function of displaying a list of video files already recorded in the HDD 5 as a recording menu screen (described later) on the monitor 8 in a recording mode or a recording programming mode, and a function of displaying the list of video files already recorded in the HDD 5 as a reproducing menu screen (also described later) on the monitor 8 in a reproducing mode. The control unit 19 is adapted to execute various kinds of recording processing and reproducing processing described later using these recording menu screen and reproducing menu screen.

Figure 2:
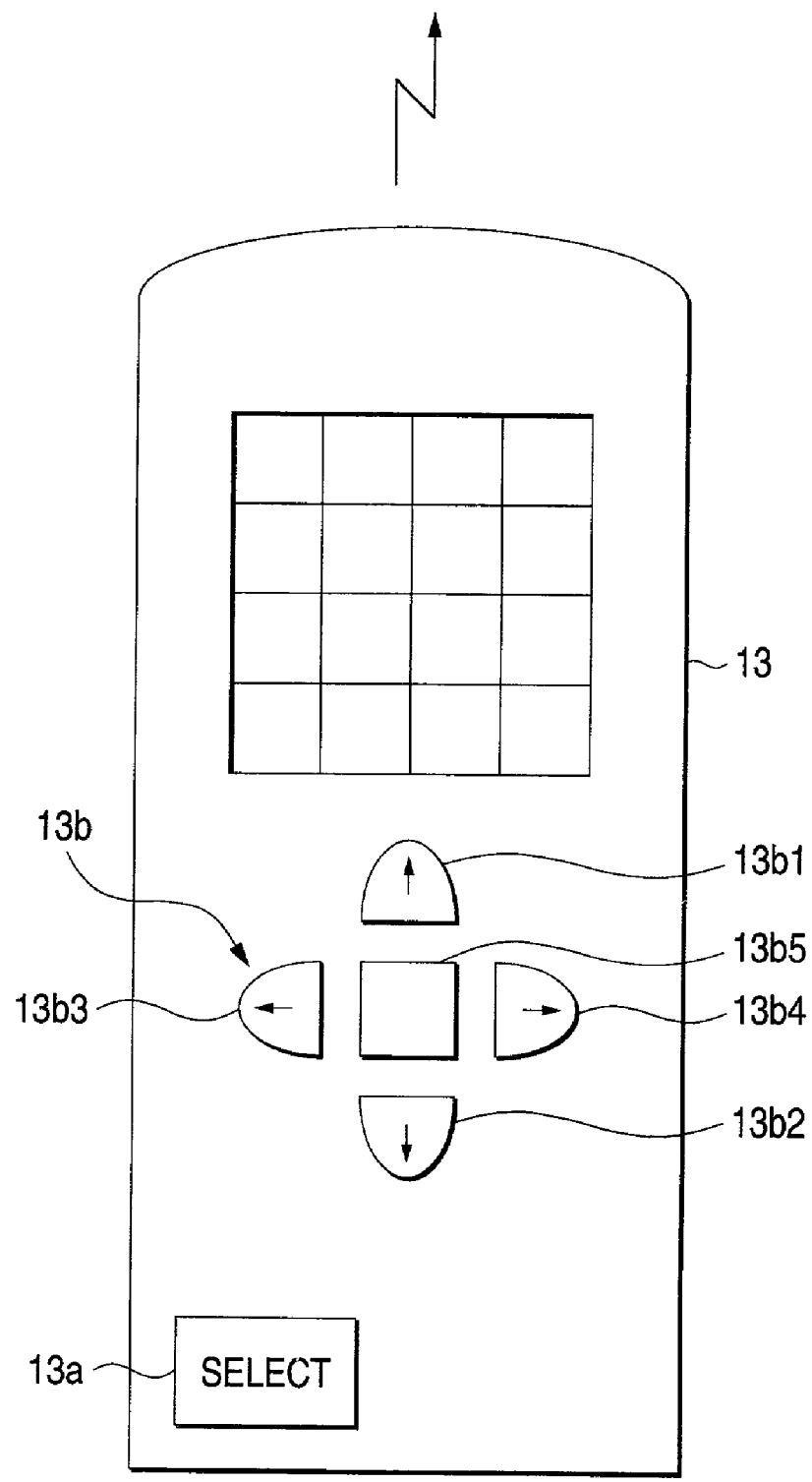
FIG. 2 is a view showing a main part of a key arrangement of a remote controller.

The remote controller 13, as seen from FIG. 2, includes a select key 13*a* for selecting the recording menu screen or the reproducing menu screen and a navigation key 13*b* for executing various operations from the recording menu screen or there producing menu screen. The navigation key 13*b* includes moving keys 13*b*1–13*b*4 for selecting a displayed job by moving a cursor displayed on the screen vertically and horizontally and a decision key 13*b*4 for deciding the contents of various selective operations, which is located at the center among the moving keys. Additionally, the remote controller 13 is also provided with a ten-digit keypad and the other kinds of function keys. They are not explained here.

Incidentally, in the video recording/reproducing apparatus described above, the operations of recording the video signal as a video data in the HDD 5 and of reproducing the video data recorded in the HDD 5 as the video signal and displaying it on the monitor 8 are entirely the same as those in the conventional video recording/reproducing apparatus. Therefore, their detailed explanation will not be given here.

Figure 3:
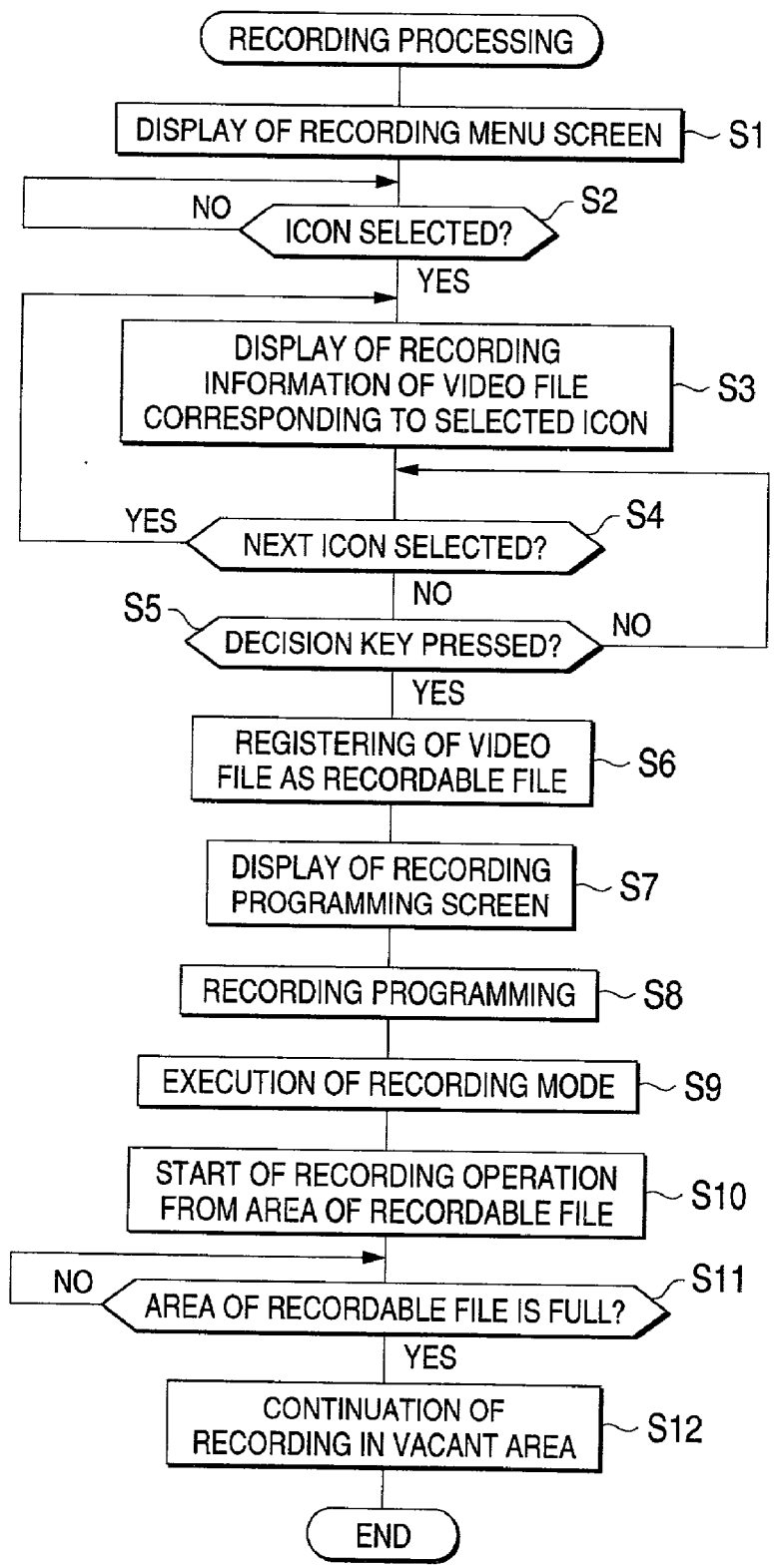
FIG. 3 is a flow chart for explaining the recording operation of the first embodiment.
Figure 4:
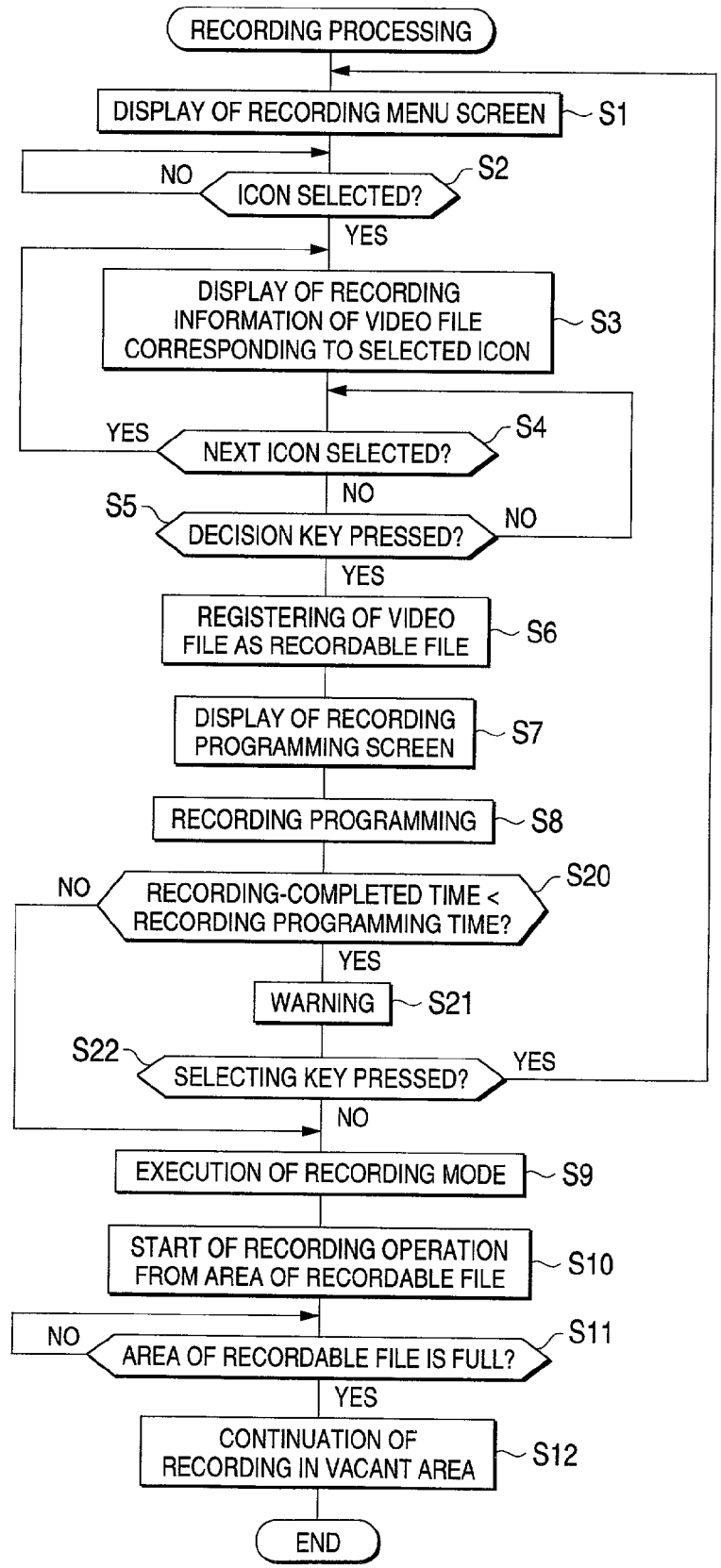
FIG. 4 is a flow chart for explaining the recording operation of the second embodiment.

Now referring to FIGS. 3 to 7, an explanation will be given of various embodiments of a recording operation by a user in the video recording/reproducing apparatus having the configuration described above. These embodiments will be explained as the first to third embodiments. FIG. 3 is a flowchart for explaining the recording operation by the first embodiment. FIG. 4 is a flowchart for explaining the recording operation by the second embodiment. FIG. 5 is a flowchart for explaining the recording operation by the third embodiment. FIGS. 6 and 7 show display screens for explaining the recording operation common to the first to third embodiments.

(Embodiment 1)

When a user operates the select key 13*a* of the remote controller 13, a key operating signal is received by the key receiving unit 12 and supplied to the control unit 10. Upon reception of the key operating signal, the control unit 10 displays a select screen (not shown) for selecting recording or reproducing on the screen of the monitor 8.

The user operates the moving keys 13*b*1–13*b*4 while seeing the selective screen. Then, he moves the cursor on the screen to the position stamped "recording" and operates the decision key 13*b*5. This key operating signal is received by the key receiving unit 12 and supplied to the control unit 10. Upon reception of the key operating signal, the control unit 10 displays a recording menu screen 20 (step S1). Specifically, the control unit 10 reads the file numbers of the video files recorded in the HDD 5 and processes these file numbers into icons, thus creating a recording menu screen and displaying it.

Figure 6A:
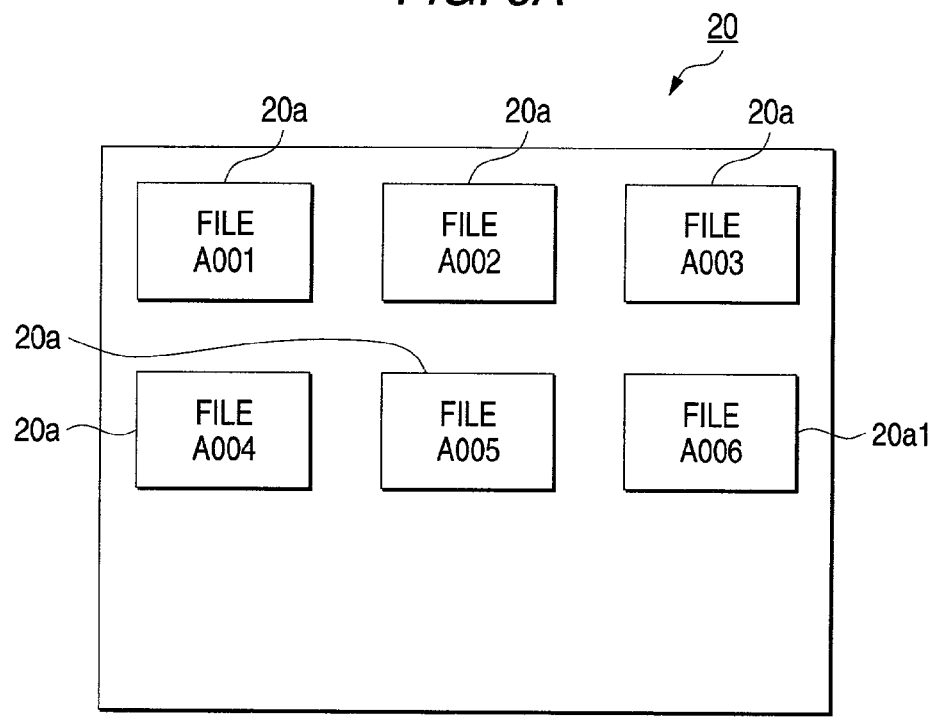
FIGS. 6A and 6B are views showing a display screen for explaining a recording operation common to the first to third embodiment.
Figure 7:
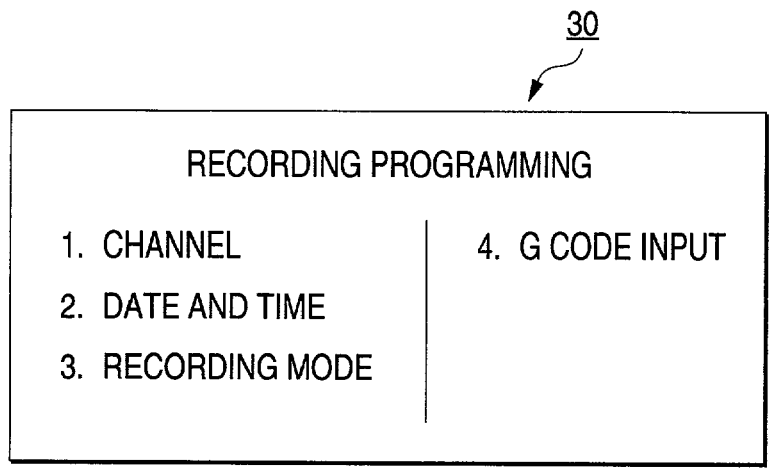
FIG. 7 is a view showing another display screen for explaining a recording operation common to the first to third embodiment.

FIG. 6A shows an example of the recording menu screen 20 thus created.

On this recording menu screen 20, file icons 20*a* . . . of 1+the number of the video data already recorded in the HDD are created and displayed. In this example, six file icons 20*a* . . . are created. The last file icon (file icon at lower right in this example) is a file icon indicative of a vacant area. Namely, the number of the video data actually recorded is 5.

Where a large number of file icons 20*a* have been created so as to correspond to a large number of video files previously created, as the case may be, all the file icons 20*a* cannot be displayed on the screen of the monitor 8. This inconvenience can be overcome by e.g. scrolling the screen so that hidden file icons 20*a* can be displayed. In this case, a scroll key must be provided on the remote controller 13. However, the movement keys 13*b*1–13*b*4 of the navigation key 13*b* can be used as the scroll key.

Now it is assumed that the user has selected any optional file icon 20*a* (e.g. upper left of the screen) from the recording menu screen 20 displayed on the monitor 8 (Actually, the movement keys 13*b*1–13*b*4 are operated so that the cursor is moved to the file icon 20*a* corresponding to the cursor and then, the decision key 13*b*5 is operated) (Yes in step S2).

Figure 6B:
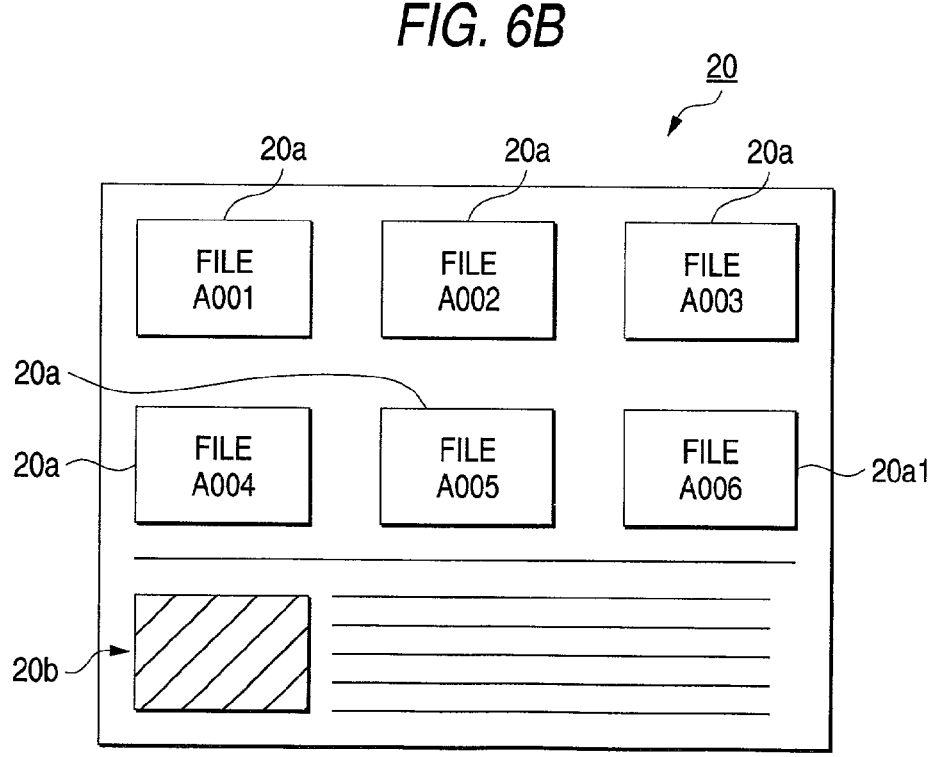

Then, the control unit 10 reads the recording information recorded on the start of the video file corresponding to the selected file icon 20a and the initial section (moving image or still image) of the pertinent video data from the HDD 5, and displays them in a content exhibiting column 20b at the lower portion on the recording menu screen 20 (see FIG. 6B). In FIG. 6B, the moving image or still image is displayed on the shaded portion, and the recording information (such as a receiving channel, recording date and time, recording ending time, recording time, recording mode, etc.) is displayed on the right side thereof (step S3).

In this way, the user operates the movement keys 13b1 – 13b4 and further the decision key 13b5 so that the file icons 20a are successively selected, and thereby can successively recognize the contents of the video data already recorded on the HDD 5 (repetition of steps S3 and S4).

Where there are video data which are already unnecessary for the user and give rise to no hitch even when overwritten, if the user presses the decision key 13b5 of the remote controller 13 again while the recording information of the pertinent video data is displayed on the content exhibiting column 20b (Yes in step S5), the video file can be registered as a recordable file (step S6).

In the first embodiment, by operating the decision key 13b5, the control unit 10 displays a recording programming screen as shown in FIG. 7. Specifically, the screen display is directly shifted from the recording menu screen to the recording programming screen. It should be noted that this recording programming screen 30 has been traditionally displayed at the time of programming the recording. Therefore, the user inputs necessary matters such as a channel, recording date and time, recording mode, etc. (or G code) and operates the decision key 13b5 to end programming of the recording (step S8). Incidentally, where the user desires to record the vide information that he is watching at present without doing the recording programming, it has only to cancel the recording programming screen and operate the recording key (not shown) of the remote controller.

Where the recording programming is thereafter done, if the recording mode is executed at the recording-programmed time (or the recording programming is canceled, and the recording key of the remote controller 13 is operated to execute the recording mode), the control unit 10 starts the recording operation in the form of overwriting the areas of registered recordable files at their outset (steps S9 and S10).

If the recording operation is not still ended even when the control unit 10 record the video data until the area of the recordable files becomes full (Yes in step S11), the control unit 10 continuously records the video data in a vacant area of the HDD 5 (step S12). In this case, it should be noted that the video data recorded in a separate manner will be managed as a single video file.

In this first embodiment, where the video data is newly recorded in the files which have become recordable by selection by the user, when the area of the recordable files become full, the video data is automatically recorded on the vacant area. On the other hand, in the second embodiment described below, decision is made on whether the recording-programmed video data can be recorded on the area of the recordable files. If decision is made that the video data cannot be recordable in only the area of the recordable files, a warning is given to the user.

(Embodiment 2)

In the flow chart of FIG. 6 for explaining the recording operation according to the second embodiment, like step numbers refer to like steps in the flow chart of FIG. 3 for explaining the above first embodiment.

Namely, in the recording operation in this embodiment, the processing from step S1 to S8 is the same as that in the first embodiment so that the processing will not be explained here.

When the recording programming is done in step S8, the control unit 10 compares the recording-completed time of the video data recorded in the video file registered as a recordable file with the recording-programmed time of the video data recording-programmed (step S20). If the recording-programmed time is longer than the recorded time (Yes in step S20), a warning (e.g. "recording is impossible in only the selected recordable files) is displayed on the monitor 8 (step S2).

If the user having seen this warning operates the selection key 13a of the remote controller 13 (Yes in step S22), the processing by the control unit 10 returns to step S1 again to display the recording menu screen 20 on the screen of the monitor 8. At this time, the file icons which has been already selected as the recordable files is also displayed. When the user selects this file icon 20a, message such as "this video file has been already registered as a recordable file" is displayed on the contents exhibiting column 29b.

The user selects the video file which may be canceled from the recording menu screen 20 and registers it as a recordable file via steps S2–S6. Thereafter, in step S20, comparison is made between the recording-completed time and the recording-programmed time. In this case, the recording-completed time is a total of the respective recording-completed times of two selected video files.

If the recording-programmed time is shorter than the recording-completed time (N in step S20), the processing by the control unit 10 proceeds to step S9. The subsequent recording operation will be performed. On the other hand, if the recording-programmed time is longer than the recording-completed time (Yes in step S20), a warning is displayed again on the monitor (step S21).

In the recording operation in the first and the second embodiment, after the video file which may be canceled is selected on the recording menu screen 20, the processing proceeds to the recording programming screen 30 on which the recording programming will be carried out. On the other hand, in the following third embodiment, after the recording programming is executed on the recording-programming screen 30, the vide file which may be canceled is selected on the recording menu screen 20.

(Embodiment 3)

When the user operates the recording programming key (not shown) of the remote controller 13, the key operating signal is received by the key receiving unit 12 and further by the control unit 10. Upon reception of this key operating signal, the control unit 10 displays the recording programming screen 30 shown in FIG. 6 on the screen of the monitor 8 (steps S31 and S32). The user writes necessary matters e.g. channel, recording date and time, recording starting time, recording ending time, etc. (or G code) in the recording programming screen 30. Then, he operates the decision key 13b5 so that the recording programming is completed (step S33).

Thereafter, when the user operates the recording programming key (not shown) of the remote controller 13, the key operating signal is received by the key receiving unit 12 and further by the control unit 10. Upon reception of this key operating signal, the control unit 10 displays a selecting screen (not shown) on which recording or reproducing should be selected on the screen of the monitor 8 (step S34, S35).

While seeing the selecting screen, the user operates the movement keys 13b1–13b4 to move the cursor on the screen to the position stamped "recording" and then operates the decision key 13b (step S36). This key operating signal is received by the key receiving unit 12 and further by the control unit 10. Upon reception of this key operating signal, the control unit 10 displays the recording menu screen 20 shown in FIG. 6A on the screen of the monitor 8 (step S37). Specifically, the control unit 10 reads the file numbers of the video files recorded in the HDD 5 and processes these file numbers into icons, thus creating a recording menu screen and displaying it.

Now it is assumed that the user has selected any optional file icon 20a (e.g. upper left of the screen) from the recording menu screen 20 displayed on the monitor 8 (Actually, the movement keys 13b1–13b4 are operated so that the cursor is moved to the file icon 20a corresponding to the cursor and then, the decision key 13b5 is operated) (Yes in step S38). Then, the control unit 10 reads the recording information recorded on the start of the video file corresponding to the selected file icon 20a and the initial section (moving image or still image) of the pertinent video data from the HDD 5, and displays them at a content exhibiting column 20b at the lower portion on the recording menu screen 20 as shown in FIG. 6B (step S39).

In this way, the user operates the movement keys 13b1 – 13b4 and further the decision key 13b5 so that the file icons 20a are successively selected, and thereby can successively recognize the contents of the video data already recorded on the HDD 5 (repetition of steps S39 and S40).

Where there are video data which are already unnecessary for the user and give rise to no hitch even when overwritten, if the user presses the decision key 13b5 of the remote controller 13 again while the recording information of the pertinent video data is displayed on the content exhibiting column 20b (Yes in step S41), the video file can be registered as a recordable file (step S42).

After the recording programming and the registering of the recordable files are done, if the recording mode is executed at the recording-programmed time (step S43), the control unit 10 starts the recording operation in the form of overwriting the areas of registered recordable files at their outset (step S44).

If the recording operation is not still ended even when the control unit 10 records the video data until the area of the recordable files becomes full (Yes in step S45), the control unit 10 continuously records the video data in a vacant area of the HDD 5 (step S46).

In this third embodiment, where the video data is newly recorded in the files which have become recordable by selection by the user, when the area of the recordable files become full, the video data is automatically recorded on the vacant area. However, when the recordable files are registered on the recording menu screen 20, decision can be made on whether the recording-programmed video data can be recorded on the area of the recordable files. If decision is made that the video data cannot be recordable in only the area of the recordable files, a warning is given to the user. Actually, when the selected video files are registered as the recordable files in step S42 in FIG. 5, the processing of steps S20–S22 in FIG. 4 will be executed and thereafter the processing proceeds to step S43. In this case, it should be noted that if Yes in step S22, the processing returns to step S37.

Figure 8:
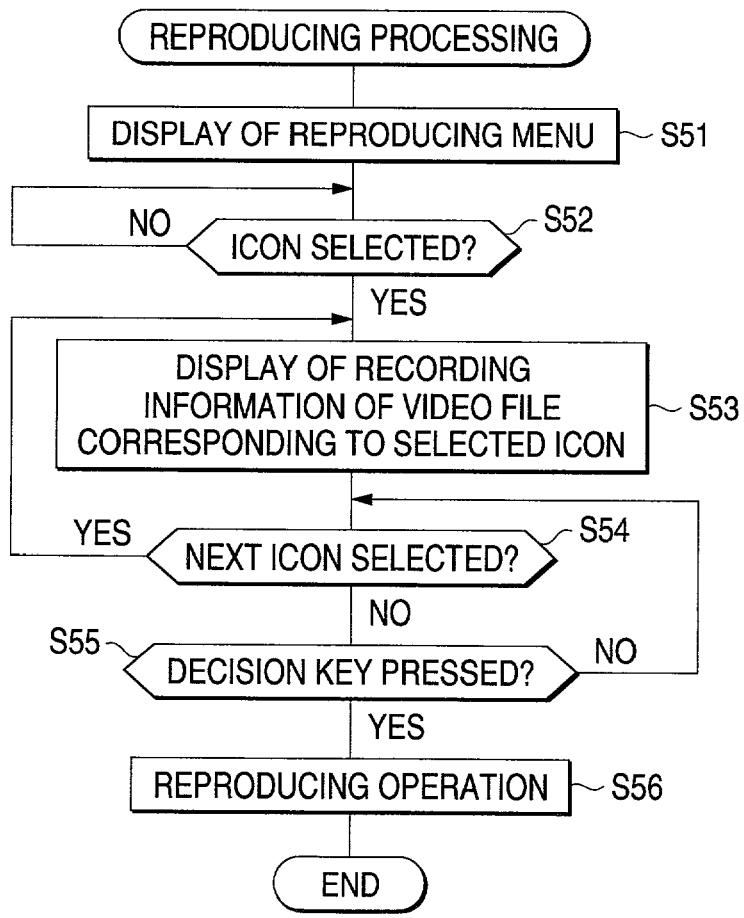
FIG. 8 is a flow chart for explaining the reproducing operation executed by a user in the video recording/reproducing apparatus according to this invention.

Now referring to the flowchart for explaining the reproducing operation shown in FIG. 8 and an exemplary display screen shown in FIG. 9, an explanation will be given of an embodiment of a reproducing operation executed by a user in the video recording/reproducing apparatus having the configuration described above.

(Embodiment 4)

When a user operates the select key 13a of the remote controller 13, a key operating signal is received by the key receiving unit 12 and supplied to the control unit 10. Upon reception of the key operating signal, the control unit 10 displays a selecting screen (not shown) for selecting recording or reproducing on the screen of the monitor 8.

The user operates the moving keys 13b1–13b4 while seeing the selecting screen. Then, he moves the cursor on the screen to the position stamped "recording" and operates the decision key 13b5. This key operating signal is received by the key receiving unit 12 and supplied to the control unit 10.

Upon reception of the key operating signal, the control unit 10 displays a reproducing menu screen 20 on the screen of the monitor 8 (step S51). Specifically, the control unit 10 reads the file numbers of the video files recorded in the HDD 5 and processes these file numbers into icons, thus creating a recording menu screen and displaying it.

Figure 9A:
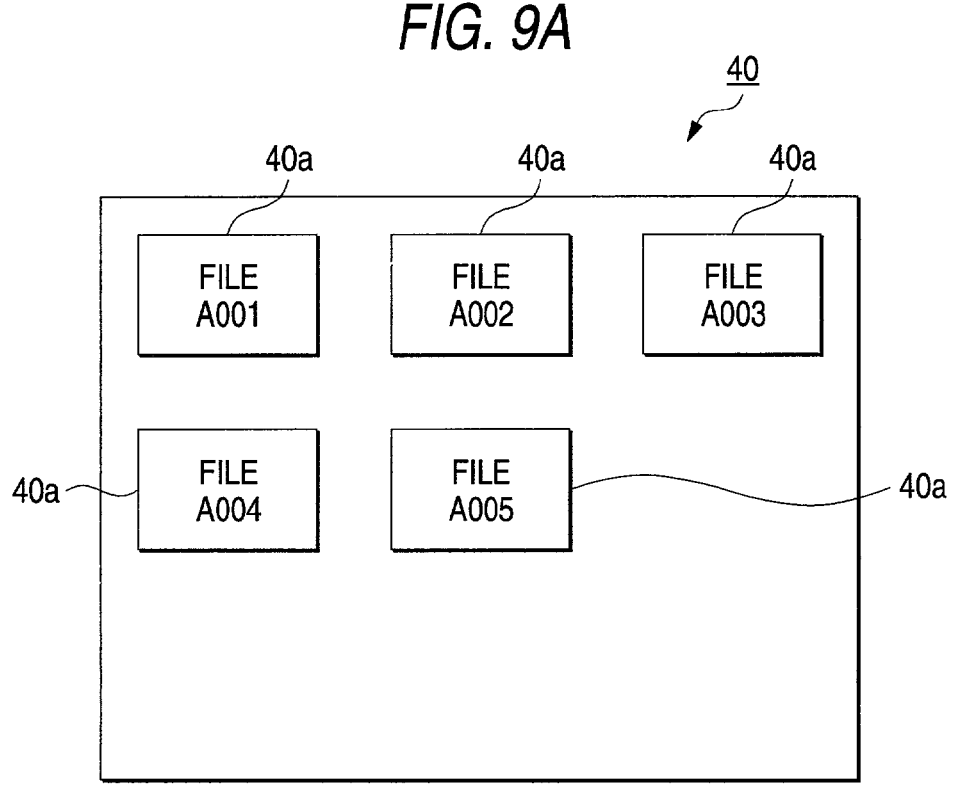
FIGS. 9A and 9B are views showing a display screen for explaining a reproducing operation.
Figure 9B:
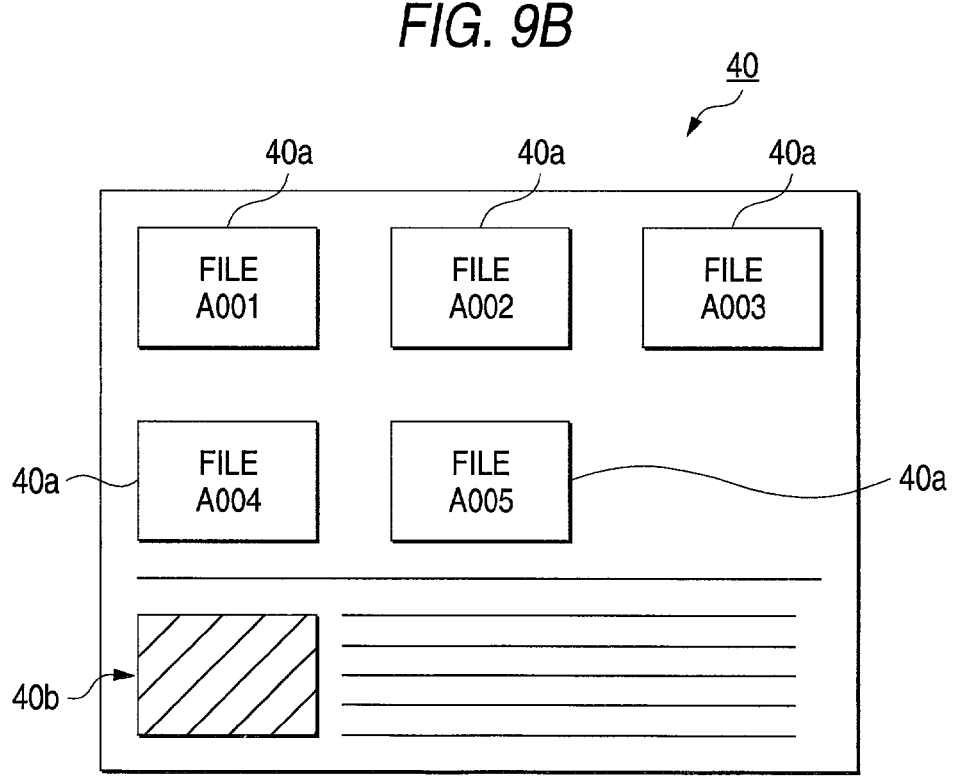

FIG. 9A shows an example of the reproducing menu screen 40 thus created.

On this recording menu screen 40, file icons 40a . . . of 1+the number of the video data already recorded in the HDD 5 are created and displayed. In this example, five file icons 40a . . . are created so as to correspond to the recording menu screen 20. As seen, the file icon 20a1 indicative of the vacant area displayed on the recording menu screen 20 is not displayed on the reproducing menu screen 40.

Where a large number of file icons 40a have been created so as to correspond to a large number of video files previously created, as the case may be, all the file icons 20a cannot be displayed on the screen of the monitor 8. This inconvenience can be overcome by e.g. scrolling the screen so that hidden file icons 20a can be displayed.

Now it is assumed that the user has selected any optional file icon 40a (e.g. upper left of the screen) from the recording menu screen 40 displayed on the monitor 8 (Actually, the movement keys 13b1–13b4 are operated so that the cursor is moved to the file icon 40a corresponding to the cursor and then, the decision key 13b5 is operated) (Yes in step S52). Then, the control unit 10 reads the recording information recorded on the start of the video file corresponding to the selected file icon 40a and the initial section (moving image or still image) of the pertinent video data from the HDD 5, and displays them in a content exhibiting column 20b at the lower portion on the reproducing menu screen 40 (see FIG. 9B). In FIG. 6B, the moving image or still image is displayed on the shaded portion, and the recording information (such as a receiving channel, recording date and time, recording ending time, recording time, recording mode, etc.) is displayed on the right side thereof (step S53)

In this way, the user operates the movement keys 13b1 –13b4 and further the decision key 13b5 so that the file icons 20a are successively selected, and thereby can successively recognize the contents of the video data already recorded on the HDD 5 (repetition of steps S3 and S4) Thus, the user can easily recognize the contents of the video data recorded in the HDD 5.

In a state where the recording informing of the video data that the user wants to reproduce has been recorded in the content exhibiting column 20b, if the user operates the decision key 13b5 again, the control unit 10 reads the video data of the video file restores them into the original video data in the extension processing unit 6, and successively send the restored data to the monitor 8 so that the video data are reproduced (step S56). Thus, the user can easily search the video data he wants to reproduce from the various video data recorded in the HDD 5 and easily reproduce.

Figure 10A:
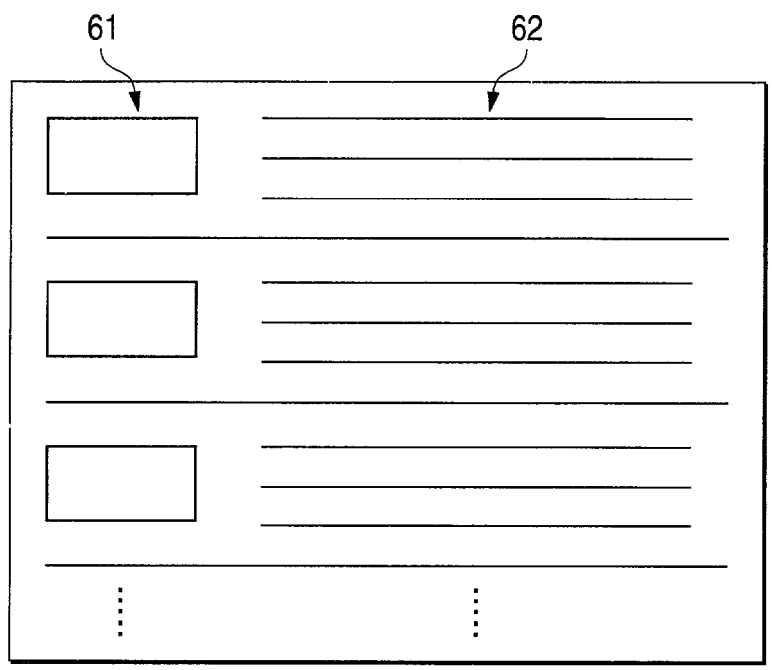
FIGS. 10A and 10B are views showing other display screens for a recording menu screen and a reproducing menu screen.
Figure 10B:
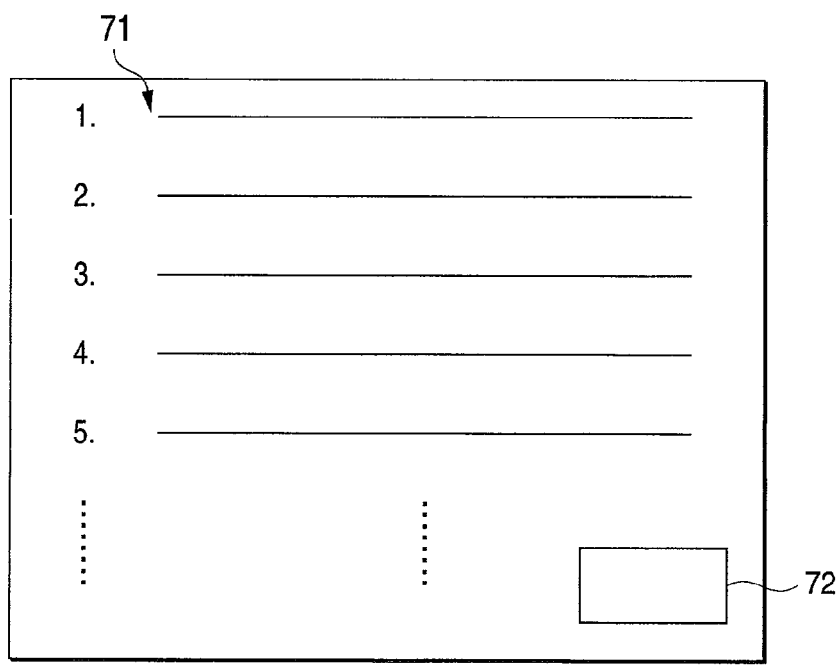

FIGS. 10A and 10B show other examples of the recording menu screen 20 and the reproducing menu screen 40.

In the first to fourth embodiments, as seen from FIGS. 6 and 9, only the file numbers of the video files recorded in the HDD 5 are displayed as icons, and when any optional icon is selected, the contents of the corresponding video file (a part of the image and recording information) are displayed beneath it.

On the recording or reproducing menu screen shown in FIG. 10A, the information of all the recorded video files are displayed on the screen of the monitor 8. Specifically, on the left side of the screen, an initial portion of the video data (moving image or still image) is displayed (denoted by numeral 61), and on the right side of the screen, the recording information recorded at the starting portion of each video file which manages the pertinent video data (e.g. receiving channel, recording date and time, recording starting time, recording ending time, recording mode, etc.) is displayed (denoted by numeral 62). Pairs of the part 61 of the video data and the recording information of the video thereof are displayed by the quantity of the recorded video files in a state where they are arranged vertically.

Where a large number of video files have been previously created, as the case may be, the whole information of all the video files cannot be displayed on the screen of the monitor 8. This inconvenience can be overcome by e.g. scrolling the screen vertically so that hidden video file information can be displayed.

In the recording or reproducing menu screen shown in FIG. 10B, on the screen of the monitor, only the recording information of all the recorded video files (e.g. receiving channel, recording date and time, recording starting time, recording ending time, recording time, recording mode, etc.) is displayed (denoted by numeral 71). At the lower right position, a window (moving image or still image) representative of an initial portion of any optional video data is provided. In this case, when the recording information of any optional video file displayed on the screen e.g. receiving channel, recording date and time, recording starting time, recording ending time, recording time, recording mode, etc.) is selected, a part of the video data of the video file containing the selected recording information is displayed in the window.

Where a large number of video files have been previously created, as the case may be, all the recording information of all the video files cannot be displayed on the screen of the monitor 8. This inconvenience can be overcome by e.g. scrolling the screen vertically so that the recording information of the hidden video files can be displayed.

[Effect of the Invention]

In accordance with the video recording/reproducing apparatus of this invention, where the user wants to make the recording or reproducing, since the list of video files of various video data previously recorded in the recording/reproducing disk is displayed as the recording menu screen or reproducing menu screen, the user can easily select the video file which may be canceled for overwrite-recording or the user wants to reproduce. If there is the video file which may be canceled for overwrite-recording, by selecting the video file on the recording menu screen, the display is automatically advances to an ordinary recording programming screen. Thus, the user can continuously make the recording programming as usual.

Further, the video recording/reproducing apparatus of this invention comprises: display section for displaying a list of video files previously recorded in the recording/reproducing disk as a recording menu screen in a recording mode or recording programming mode; and control section for recording new video data in a manner of overwriting an area containing any optional recorded video file when the optional video file is selected from the list on the recording menu screen. In this configuration, when the user selects the video file which may be canceled from the recording menu screen, the new data is recorded in the area selected by the user. In short, the recording area by overwriting can be freely selected by the intension of the user.

Further, in accordance with the video recording/reproducing apparatus of this invention, in the recording programming mode, the control section displays the recording programming screen on the display section to enable recording programming when any optional video file is selected from the list on the recording menu screen. In this configuration, if there is the video file which may be canceled for overwrite-recording, by selecting the video file on the recording menu screen, the display is automatically advances to an ordinary recording programming screen. Thus, the user can continuously make the recording programming as usual.

Further, in accordance with the video recording/reproducing apparatus of this invention, in the recording programming mode, the control section displays the recording programming screen on the display section to enable recording programming, and displays the recording menu screen on the display section when it receives a completion signal of the recording programming. In this configuration, when the user makes the recording programming, the display is automatically advances to an ordinary recording programming screen so that the recording area of the video data recording-programmed this time can be selected from the recording menu screen. Namely, if the user want to leave all the video data previously recorded, by selecting a vacant area, the control section can record a new video data in the vacant area of the recording/reproducing disk. Further, there is an unnecessary video file which he has watched, by selecting this unnecessary video file on the recording menu screen, the control section can overwrite-record the new video data in the area in which the video data of this video file has been recorded. In short, the recording area can be selected according to the intention of the user.

Further, in accordance with the video recording/reproducing apparatus of this invention, the control section compares the recording-completed time of the video data recorded in a selected video file with the recording-programmed time of the video data recording-programmed, and if the recording-programmed time is longer than the recording-completed time, gives a warning from the display section. Giving the warning permits the user to select the subsequent measure freely.

Further, in the video recording/reproducing apparatus of this invention, if the recording operation is not completed even when the video data is recorded until the area of the video file selected from the recording menu screen becomes full, the control section continuously records the video data in a vacant area of the recording/reproducing disk. In this configuration, even if the video data which is being recorded is longer than the video data which is being overwritten, the recording operation is not suspended on the way.

Further, in accordance with the video recording/reproducing apparatus of this invention, in the reproducing mode, the display section displays a list of video files previously recorded in the recording/reproducing disk as a reproducing menu screen; and the control section reproduces the video data recorded in any optional file when the optional file is selected from the list on the reproducing menu screen. In this configuration, since not only the recording menu screen but also the reproducing menu screen is displayed by selection by the user, by seeing the list of the video files displayed on the reproducing menu screen, the user can easily select and reproduce the video file which he want to watch.

What is claimed is:

1. A video recording/reproducing apparatus for recording various video data as files in a recording/reproducing disk and reproducing the recorded video data so that they are displayed on a screen, comprising:
   a display section for displaying a list of video files previously recorded in said recording/reproducing disk as a recording menu screen or a reproducing menu screen;
   a selecting section for selecting either one of said recording menu screen and said reproducing menu screen;
   a recording control section which enters a recording programming mode to display the recording menu screen on said display section when the recording menu screen is selected by said selecting section, and displays a recording programming screen on said display section to enable recording programming when any optional video file is selected from the list on said recording menu screen; and
   a reproducing control section which enters a reproducing mode to display said reproducing menu screen on said display section, when said reproducing menu screen is selected by said selecting section, and reproduces the video data recorded in any optional file when said optional file is selected from the list on said reproducing menu screen,
   wherein said recording control section records the video data in an area of the video file selected from said recording menu screen during a recording operation, and when the recording operation is not completed even when the video data is recorded until said area becomes full, continuously records the video data in a vacant area of said recording/reproducing disk.

2. A video recording/reproducing apparatus for recording various video data as files in a recording/reproducing disk and reproducing the recorded video data so that they are displayed on a screen, comprising:
   a display section for displaying a list of video files previously recorded in said recording/reproducing disk as a recording menu screen in a recording mode or recording programming mode; and
   a control section for recording a new video data in a manner of overwriting an area containing any optional recorded video file when the optional recorded video file is selected from the list on said recording menu screen;
   wherein said control section compares a recording-completed time of the video data recorded in a selected video file with a recording-programmed time of the video data recording-programmed, and if said recording-programmed time is longer than said recording-completed time, gives a warning from said display section.

3. The video recording/reproducing apparatus according to claim 2, wherein in the recording programming mode, said control section displays a recording programming screen on said display section to enable recording programming when any optional video file is selected from the list on the recording menu screen.

4. The video recording/reproducing apparatus according to claim 2, wherein in the recording programming mode, said control section displays a recording programming screen on said display section to enable recording programming, and displays the recording menu screen on said display section when said control section receives a completion signal of the recording programming.

5. The video recording/reproducing apparatus according to claim 2, wherein in the reproducing mode, said display section displays a list of video files previously recorded in said recording/reproducing disk as a reproducing menu screen; and said control section reproduces the video data recorded in any optional file when said optional file is selected from the list on said reproducing menu screen.

6. A video recording/reproducing apparatus for recording various video data as files in a recording/reproducing disk and reproducing the recorded video data so that they are displayed on a screen, comprising:
   a display section for displaying a list of video files previously recorded in said recording/reproducing disk as a recording menu screen in a recording mode or recording programming mode; and
   a control section for recording a new video data in a manner of overwriting an area containing any optional recorded video file when the optional recorded video file is selected from the list on said recording menu screen;
   wherein if the recording operation is not completed even when the video data is recorded until said area of the video file selected from the recording menu screen becomes full, said control section continuously records the video data in a vacant area of said recording/reproducing disk.

7. The video recording/reproducing apparatus according to claim 6, wherein in the recording programming mode, said control section displays a recording programming screen on said display section to enable recording programming when any optional video file is selected from the list on the recording menu screen.

8. The video recording/reproducing apparatus according to claim 6, wherein in the recording programming mode, said control section displays a recording programming screen on said display section to enable recording programming, and displays the recording menu screen on said display section when said control section receives a completion signal of the recording programming.

9. The video recording/reproducing apparatus according to claim 6, wherein in the reproducing mode, said display section displays a list of video files previously recorded in said recording/reproducing disk as a reproducing menu screen; and said control section reproduces the video data recorded in any optional file when said optional file is selected from the list on said reproducing menu screen.

* * * * *